US000001320H

United States Statutory Invention Registration [19]

[11] Reg. Number: H1320

Kieronski

[43] Published: Jun. 7, 1994

[54] APPARATUS AND METHOD AND MEANS FOR PRODUCING A NATURAL COLOR DISPLAY

[75] Inventor: Robert V. Kieronski, Newport, R.I.

[73] Assignee: The United States of America as represented by the Secretary of the Navy, Washington, D.C.

[21] Appl. No.: 899,980

[22] Filed: Jun. 17, 1992

[51] Int. Cl.[5] ..... H04N 9/12

[52] U.S. Cl. ..... 359/48; 348/739; 348/751; 348/761; 348/766; 348/790; 348/791

[58] Field of Search ..... 358/56, 57, 58, 59, 358/60, 61, 62, 63, 231, 232, 233; H04N 9/12

[56] References Cited

U.S. PATENT DOCUMENTS

| | | | |
|---|---|---|---|
| 2,921,118 | 1/1960 | Benjamin | 358/58 |
| 3,184,539 | 5/1965 | Thomas | 358/56 |
| 3,303,273 | 2/1967 | Williams et al. | 358/58 |
| 4,090,219 | 5/1978 | Ernstoff et al. | 358/59 |
| 4,907,862 | 3/1990 | Suntola | 358/58 |

*Primary Examiner*—Bernarr E. Gregory

*Attorney, Agent, or Firm*—Michael J. McGowan; Prithvi C. Lall

[57] ABSTRACT

A method for producing a natural color display on a display panel, wherein a means for reformatting video signal images for a grey-scale matrix liquid crystal or ferroelectric liquid crystal panel such that frames of image are presented sequentially in time, each frame containing the information of a particular color, and then illuminating said image with the appropriate primary color light. Such images are presented to the viewer at a rate above the color fusion frequency of the eye and thus appear as a full color image.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD AND MEANS FOR PRODUCING A NATURAL COLOR DISPLAY

STATEMENT OF GOVERNMENT INTEREST

The invention described herein may be manufactured and used by or for the Government of the United States of America for government purposes without the payment of any royalties thereon or therefor.

BACKGROUND OF THE INVENTION

1. Field Of The Invention

The invention relates to color video and computer displays and to an improved apparatus and method for producing a full color video or computer display using a light modulator such as a liquid crystal panel.

2. Description Of The Prior Art

Transmissive light valve matrix panel displays (such as liquid crystal image panels) use an x:y matrix of scanned horizontal and vertical conductive stripes. The intersection of these stripes define pixels of variable light transmission which are the basic picture elements. Together, these pixels form the image on the panel. Each horizontal or vertical stripe requires an individual electronic driving element, hereinafter called driver, which is usually part of a special purpose integrated circuit. The stripes are electronically scanned in order to control the monochromatic transmission (i.e., brightness) of the pixels, thereby forming an image.

There are several currently known means for producing color from such a light valve matrix display. As an example, first means for obtaining color with such a display is to overlay the monochromatic matrix with an arrangement of primary color filters in the form of stripes or pixel-sized dots so that closely spaced groupings (usually consisting of three primary colors: i.e., red, blue and green) spatially merge when seen by the eye. Such a grouping of pixels is sometimes referred to in the literature as a "pel." In this case, each pel is composed of three pixels and requires three drivers. A color display made by this means sacrifices resolution for the sake of color, there being three times as many pixels (i.e., red, blue and green) as in a monochromatic display of equivalent resolution.

A second means for producing color images is to use three separate monochromatic panels, one for each primary color. The images from each of these panels is filtered and optically merged to create a single color image for the viewer. As in the first example, three separate pixels (and associated driving electronics) are required in the formation of a single pel.

There are still other means for obtaining color images involving partial polarization, interference phenomena and special diffraction phenomena.

Additionally, an example of a prior attempt to provide a means for producing a natural color display is seen in U.S. Pat. No. 4,978,952 to Irwin. Which discloses a display including a matrix of horizontal and vertical elements illuminated by light emitting diodes (LEDs) and gated by a liquid crystal light valve.

The Irwin device requires three separate drivers and light sources for each pel. Thus, in a viewing screen comprising 640 color pels across, the Irwin device would require 1,920 separate vertical drivers. Since the Irwin device has difficulty achieving minimal weight and flexible weight distribution, it would not be useful for head mounted display systems where weight must be minimized and weight distribution must be considered.

Furthermore, Irwin creates the picture by selective blocking of light with horizontal liquid crystal shutter elements. The use of shutter elements, in combination with the other elements used to drive the display, results in a display with relatively high power consumption and low efficiency. For example, if the display disclosed in the Irwin patent were comprised of 640 vertical elements, then less than 1/640th of the light input generated by the LEDs would be used at any given time for pixel illumination.

Earlier video systems, such as the frame sequential CBS/RCA television systems, used cathode ray tubes and spinning color wheels. By their nature they were limited in both size and definition by the requirement that the color wheel be substantially larger than the screen face and that it be of high optical quality.

SUMMARY OF THE INVENTION

A first object of subject invention is to provide a method and means for producing an improved natural color matrix display which offers substantial improvements in resolution and/or complexity reduction for a given difficulty of panel fabrication.

A second object of the invention is to provide, for a specified color resolution, reduced complexity of the panel driving elements by as much as two thirds over the prior art, thus enabling relaxed manufacturing tolerances and consequent reduction of cost.

A third object of the invention is to provide, for a specified physical size of color panel display, improved resolution by as much as a factor of three over the prior art. In cases where the number of matrix stripes (and drivers) is made as high as possible in order to maintain highest resolution, the present invention will allow up to three times the color resolution in a given panel area when compared to a display made with prior-art technology.

A fourth object of the invention is to create a display system of minimum weight and flexible weight distribution that can readily be adapted to the fabrication of head mounted displays.

With the above and other objects in view, a device of subject invention works as follows: A composite National Television Standards Committee (NTSC) video or Red-Green-Blue (RGB) video is provided to the input of the device of subject invention. The device extracts horizontal synchronization (H. sync) and vertical synchronization (V. sync) timing information from the input along with extracting the input's analog brightness and color information. In the device of the subject invention, the V. sync pulses are used to advance a counter which counts in cycles of three and then returns to its original starting state. Each state of the counter corresponds to a particular primary color. If we say that green is the initial primary color, then the output of the counter controls an analog multiplexer to extract brightness information of an entire frame of picture and provides only the green brightness signal to a grey scale light valve matrix panel. When an image has been written onto the panel, timing signals derived from H. sync and V. sync cause a green light to flash, illuminating the panel from behind with green light. When the next V. sync pulse arrives, the counter is advanced one count and selects the next primary color in succession, for instance, the color 'blue'. In corresponding fashion the multiplexer is caused to select only blue brightness information for the panel. A frame of picture is written using 'blue' brightness, and as in the case of color 'green', a blue light is flashed to illuminate the panel from behind. Similarly, with the next V. sync pulse, a frame of picture is written and illuminated with the remaining primary color, namely 'red'. With the next V. sync pulse the counter returns to the 'green' state and continues with the succession of writing and illumination in the same sequence as described above.

The rate at which frames are written is rapid enough that they are above the color fusion frequency of a naked eye and the succession of pictures, each illuminated in one of the primary colors, merges in the eye to form a full color image.

The above and other features of the invention, including various novel details of construction and combination of parts, will now be more particularly described with reference to the accompanying drawings.

DESCRIPTION OF THE PREFERRED EMBODIMENT

Figure 1:
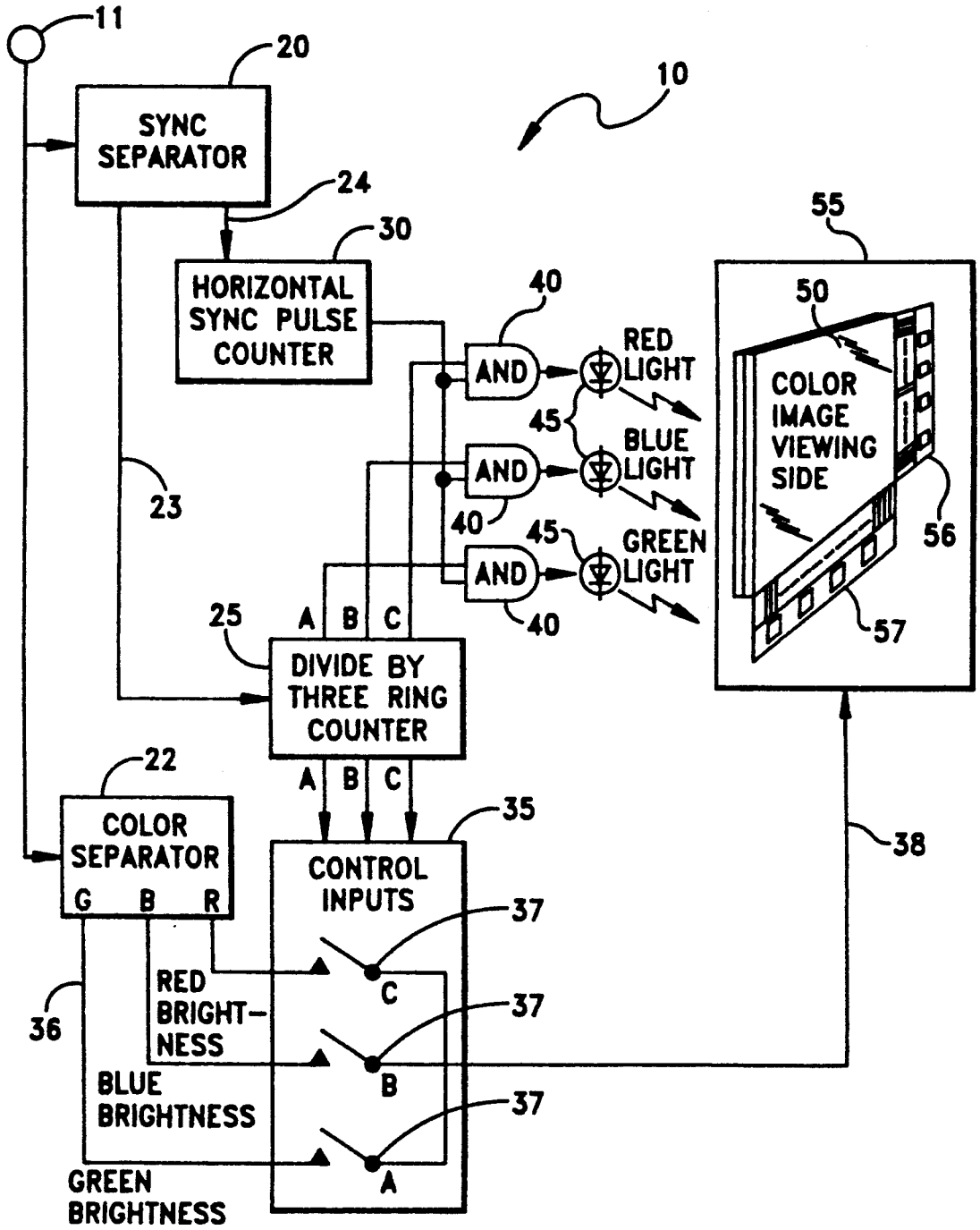
FIG. 1 is a block diagram of a preferred embodiment of electronic circuitry used in the means for producing a natural color display and having Light Emitting Diodes (LEDs), Laser Diodes, or stroboscopic gas discharge lights as the illuminating source.

Referring to FIG. 1, a block diagram of the circuit 10 is shown wherein a composite color video signal 11, such as the NTSC Standard signal used in the United States, is converted into a time sequenced signal where primary color information is extracted in alternating sequential frames. This is done by using two separators, a synchronization ("sync") separator 20 and a color separator 22. The sync separator 20 extracts both vertical (V. sync) 23 and horizontal (H. sync) 24 timing information from the color video signal 11. The V. sync 23 information is indicative of the time to begin writing a new frame of the picture, whereas the H. sync 24 information is indicative of the timing for the beginning of a new line in a frame. The color separator 22 extracts color/brightness information from the color video signal.

The V. sync 23 timing is divided into three sequentially alternating timing signals by a divide-by-three counter 25 to generate three digital control signals. Each of the three digital control signals in turn will go into high (turn on) state at the end of a frame. These digital control signals are designated as "A", "B", and "C" and occur in sequence; e.g. ABCABCABCA . . . etc. The signals, A, B, and C are sent as control signals to an analog multiplexer 35 and as a first input on a group of three separate AND gates 40.

Analog gates 37 within the multiplexer 35 are high speed electronic switches represented schematically as mechanical switches. They are operated in sequence by the digital timing signals such that if there is a digital timing signal on input A, the switch marked A closes allowing a 'green' brightness analog signal 36 from the color separator 22 to pass through as a modulating signal 38 to a grey scale light valve panel 55. In like fashion, the analog gates 37 switch red and blue brightness signals to become the modulating signal 38 for the panel 55.

The light valve panel 55 is a state-of-the-art monochromatic matrix panel containing a fast liquid crystal such as ferroelectric liquid crystal, or another suitable light modulating substance. The optical density of each pixel is modulated by brightness information modulating signal 38 at a location selected at the intersection of x and y lines driven by vertical drivers 56 and horizontal drivers 57. Standard electronics circuits are supplied as part of the panel 55 enabling proper scanning of the drivers 56 and 57 in response to the video signal 11.

With an NTSC composite video signal 11 as the input to the circuit 10, the switching of the analog gates 37 would typically occur at a 60 HZ. rate. During each 1/60th of a second, a new frame of picture would be written on the panel using brightness information of one of the three primary colors.

At the 60 Hz. rate, it would take 3/60ths of a second to write three frames of picture, each frame containing the brightness information for one of the three primary colors (red, green, and blue). Upon completion of the writing of each frame, the panel 55 is illuminated from behind with light of the appropriate primary color. This is accomplished by light sources 45 which are flashed (strobed) by timing circuitry consisting of the AND gates 40 and their inputs. One previously mentioned input comes from the divide-by-three counter 25 to determine which primary color is selected, and the other input comes from a horizontal sync pulse counter 30 to provide additional timing information.

The output of the horizontal syncpulse counter 30, is a digital pulse chosen to occur at a time when the writing of each frame is complete, but before a new frame begins, so that the illumination happens only when there is a complete picture on the panel.

The net effect of this arrangement is that the succession of frames written and illuminated in primary colors blue, green, and red, when observed from a viewing side 50 of the panel 55 which combine in the eye to form a single full color image. The speed of changing the frames is normally kept above the color fusion frequency of the eye which is usually around 16 Hz. Therefore, the separate colored images, presented sequentially in time, appear to merge into full color.

The illuminating light sources 45 may be light emitting diodes, colored gas-discharge flash lamps, pulsed laser diodes, or other types of light sources which deliver sufficient illumination in short timed bursts.

The grey-scale light valve imaging panel 55 may use liquid crystal, ferroelectric liquid crystal, or any light modulating technology, reflective or transmissive capable of responding within the time constraints of the frame refresh rate. It should be noted that the liquid crystals used ar such that they do not generate their own light.

The definition of "frame" is intended to mean the interval between vertical sync pulses independent of whether it is a complete frame, or half-interlace frame (as in the NTSC format).

The video input signal may be a composite NTSC input signal as shown, or it may be one (commonly known as RGB video) where the red, green, and blue brightness signals are already separated as is common practice on computer terminals and professional grade video equipment. In the latter case, the color separator 22 would not be required.

The analog multiplexer 35 may be any of a class of integrated circuit devices of which the MAX454 (Maxim Corp., Sunnyvale, Calif.) is an example. For this integrated circuit, the output of the counter would be required in binary code, otherwise all other features of the invention would remain the same.

The frame sequential illumination scheme of this invention is adaptable to other European video standards such as PAL and SECAM although those specific applications are not illustrated herein. The key feature of the subject invention is the use of only three colored light sources which greatly simplifies the panel structure because separate row and/or column drivers are not required for each individual color on the panel surface.

Figure 2:
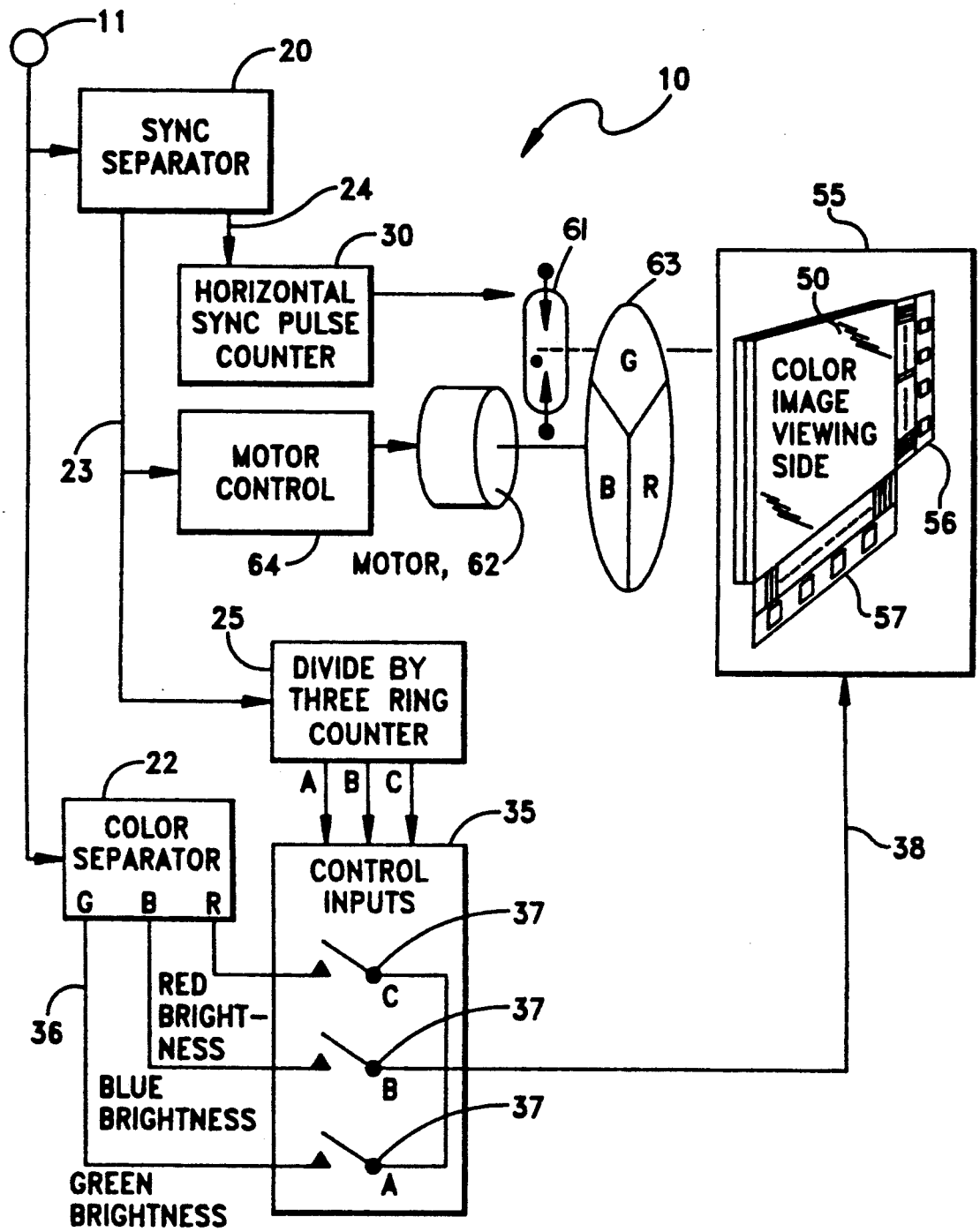
FIG. 2 is a block diagram of a first alternative embodiment using electro-mechanical means for producing the natural color display.

In the first alternative embodiment, as shown in FIG. 2, the light source lamps 45 of FIG. 1 may be replaced by an assembly which includes a rotating color wheel filter 63 and a strobed white light source 61. Light from the source 61 passes through one segment of the filter 63 at a time to illuminate the transmissive light valve panel 5 from behind.

The color wheel 63 is divided into three segments, each segment being of a different primary color, red, green, or blue. Rotation of the color wheel 63 is accomplished by a motor 62 synchronized to the vertical sync pulses by means of a motor control 64, such that the color of the filter interposing between the light source 61 and the panel 55 changes in sequence for each new frame of image. The motor control 64 may be a phase-locked loop circuit or any other type of well known equivalent control circuit.

The light source 61 is flashed once during each frame. The timing of the flash is determined by the output of the horizontal sync counter 30 to occur when a full image has been written on the panel 55.

The images generated on the panel 55 are thus illuminated with a sequence of colored light to form a full color image, as in the previous embodiment.

Figure 3:
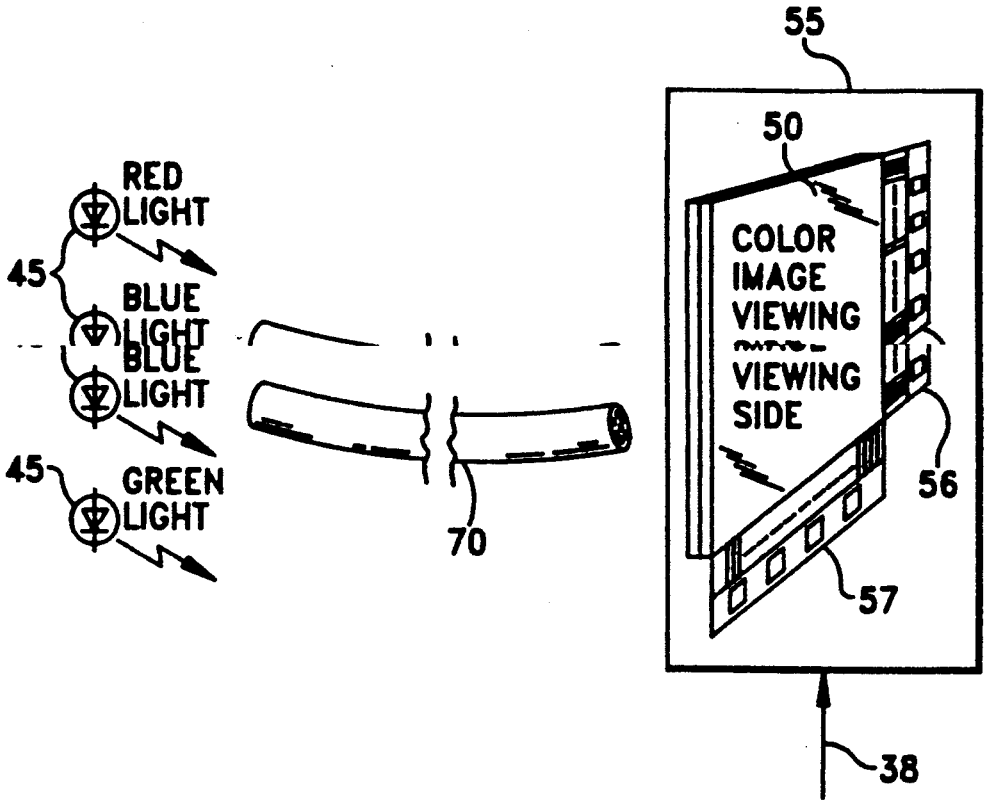
FIG. 3 is a block diagram of a second alternate embodiment wherein the light source is separated from the image panel by a non-coherent fiber optic cable.

The second alternate embodiment is shown in FIG. 3, wherein the light from sources 45 (or through the filter 63) may be transmitted to the panel 55 by means of a fiber optic 70 bundle which does not need to be coherent. Since this embodiment has features which make it particularly suited to head mounted or personal color displays it allows physical separation of the light source and the light valve panel. Such a separation is useful to reduce weight placed on the head in the instance where panel 55 is head mounted.

Figure 4:
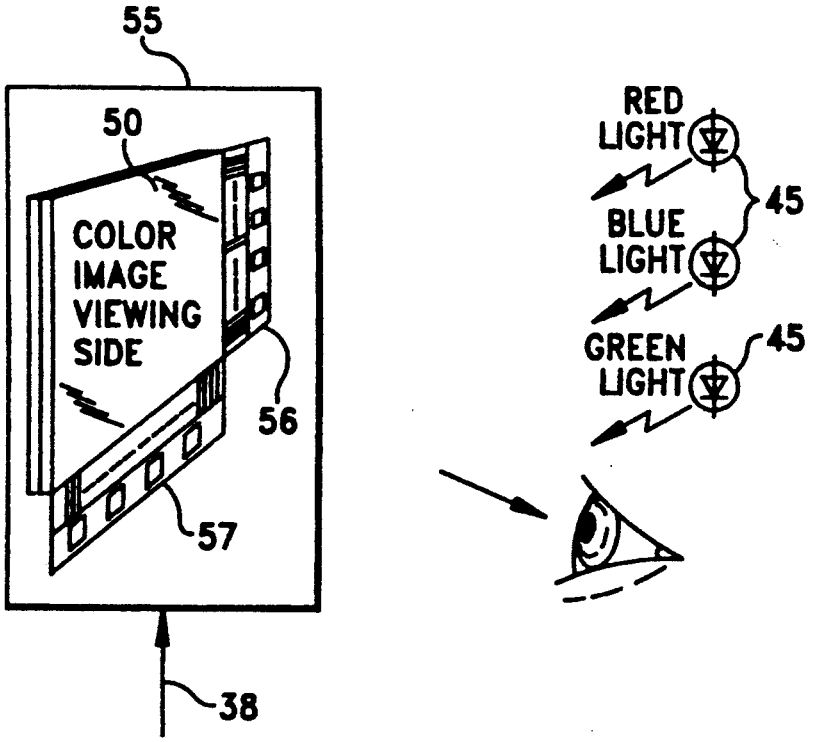
FIG. 4 is a block diagram of a third alternate embodiment wherein the light source is applied to the viewing side of a reflective type of matrix panel.

A third alternate embodiment is shown in FIG. 4, wherein a similar scheme may be used with a reflective type display, where the illuminating light source reflects from the front side of the panel instead of back side thereof. In this embodiment, ambient (room) light is would need to be excluded from the panel front surface and the front surface is illuminated by red, green, and blue lights generated in a manner similar to the method illustrated in FIG. 1.

It will be understood that the particular device and methods embodying the invention are shown by way of illustration only and not as limitations of the invention. The principles and features of this invention may be employed in various and numerous embodiments without departing from the scope of the invention. It will be therefore understood that many additional changes in the details, materials, steps and arrangement of parts, which have herein described and illustrated in order to explain the nature of the invention, may be used by those skilled in the art within the principles and scope of the invention as expressed in the appended claims.

What is claimed is:

1. An apparatus for displaying natural color of an input video signal utilizing a set of three frames of said input video signal, comprising:

a display panel means a sync separator means for extracting horizontal sync information and vertical sync information from each frame of said input video signal;

a divide-by-three counter having three output lines, said counter receiving said vertical sync information associated with each frame and issuing a digital control signal in the high state on one of said three output lines for each frame, wherein said digital control signal appears once on each of said three output lines for said set of three frames;

a color separator means for extracting brightness information on three primary colors contained in each frame of said input video signal and for providing individual brightness analog signals corresponding to each of said three primary colors for each frame;

a multiplexing means for multiplexing each of said three output lines with a corresponding one of said individual brightness analog signals wherein a modulated signal is issued to said display panel for each frame, said modulated signal containing brightness information corresponding to a selected primary color of said three primary colors, wherein the selected primary color for each frame corresponds to one of said individual brightness analog signals multiplexed with said digital control signal; and means, responsive to said horizontal sync information and said digital control signal, for lighting said display panel with the selected primary color for each frame in correspondence with said modulating signal.

2. The apparatus of claim 1 further comprising a horizontal sync pulse counter for supplying, at the end of each frame, said horizontal sync information to said means for lighting said display panel.

3. The apparatus of claim 2 wherein said means for lighting said display panel with the selected primary color includes a plurality of logical AND switches connected to a corresponding plurality of light emitting sources triggered by the simultaneity of said horizontal sync. information and said digital control signal to energize the light source of the selected primary color for each frame.

4. The apparatus of claim 3 wherein said modulating signal activates a first plurality of horizontal drivers and a second plurality of vertical drivers to display each frame of said input video signal on said display panel.

5. The apparatus of claim 4 wherein said display panel comprises a liquid crystal type of display.

6. The apparatus of claim 4 wherein said display panel includes ferroelectric liquid crystal material.

7. A method for displaying natural color of an input video signal on a display panel utilizing a set of three frames of said input video signal, comprising the steps of:

extracting vertical sync information from each frame of said input video signal;

generating, based on the presence of said vertical sync information, a digital control signal in the high state for each frame;

extracting brightness information on three primary colors contained in each frame of said input video signal;

providing individual brightness analog signal corresponding to each of said three primary colors for each frame;

multiplexing said digital control signal in the high state with a corresponding one of said individual brightness analog signals wherein a modulated signal is issued to said display panel for each frame, said modulated signal containing brightness information corresponding to a selected primary color of said three primary colors, wherein the selected primary color for each frame corresponds to one of said individual brightness analog signals multiplexed with said digital control signal, and wherein the selected primary color is different for each frame in said set of three frames; and lighting said display panel with the selected primary color for each frame in correspondence with said modulating signal.

* * * * *